United States Patent
Kohli

(10) Patent No.: US 11,586,606 B2
(45) Date of Patent: Feb. 21, 2023

(54) KEY VALUE FAULT INTERCEPTION INCLUDING SURROGATE RESPONSES

(71) Applicant: MASTERCARD INTERNATIONAL INCORPORATED, Purchase, NY (US)

(72) Inventor: Manoneet Kohli, White Plains, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 321 days.

(21) Appl. No.: 16/543,316

(22) Filed: Aug. 16, 2019

(65) Prior Publication Data

US 2021/0049145 A1 Feb. 18, 2021

(51) Int. Cl.
G06F 16/00 (2019.01)
G06F 16/23 (2019.01)
G06F 16/215 (2019.01)

(52) U.S. Cl.
CPC ........ *G06F 16/2365* (2019.01); *G06F 16/215* (2019.01)

(58) Field of Classification Search
CPC ............... G06F 16/2365; G06F 16/215; G06F 21/6245; G06F 16/2379; G06F 16/258
See application file for complete search history.

(56) References Cited

U.S. PATENT DOCUMENTS 6,304,967 B1 10/2001 Braddy
7,467,333 B2 12/2008 Keeton et al.
9,229,881 B2 * 1/2016 Epstein ............... G06F 9/44563
9,547,864 B2 1/2017 Howe
9,646,303 B2 5/2017 Karpenko et al.
10,146,642 B1 12/2018 Bent
10,185,642 B1 1/2019 Havemose
(Continued)

FOREIGN PATENT DOCUMENTS

RU 2552186 C2 6/2015

OTHER PUBLICATIONS

Ciobotea, Cristian. Improving payment authorization rates: by intelligently routing transactions. MS thesis. University of Twente, 2016.*

(Continued)

*Primary Examiner* — Nan Hutton
(74) *Attorney, Agent, or Firm* — Armstrong Teasdale LLP

(57) ABSTRACT

In one aspect, a fault intercepting computing device is provided. The fault intercepting computing devices receives a request message including an outdated key value from a client computing device, retrieves an updated key value from a key mapping database, generates a remapped request based on the request message by replacing the outdated key value with the updated key value in the request message, and transmits the remapped request to a host computing device. The fault intercepting computing device further receives an initial response from the host computing device including the updated key value, generates a surrogate response based on the initial response by replacing the updated key value with the outdated key value, appends a key remapped flag to the surrogate response, transmits the surrogate response, including the outdated key value to the client computing device.

21 Claims, 8 Drawing Sheets

(56) References Cited

U.S. PATENT DOCUMENTS

| | | | |
|---|---|---|---|
| 2002/0143764 A1 | 10/2002 | Martin et al. | |
| 2005/0149543 A1* | 7/2005 | Cohen | H04L 67/10 |
| 2012/0296824 A1* | 11/2012 | Rosano | G06Q 20/102 |
| | | | 705/44 |
| 2014/0032409 A1* | 1/2014 | Rosano | G06Q 20/409 |
| | | | 705/44 |
| 2016/0155124 A1* | 6/2016 | Howe | G06Q 20/34 |
| | | | 705/44 |
| 2016/0253652 A1 | 9/2016 | Je et al. | |
| 2018/0165344 A1* | 6/2018 | Williams | G06F 16/275 |

OTHER PUBLICATIONS

Cutshaw, Jamie. Online authentication challenges for financial institutions in a complex digital era. Diss. Utica College, 2015.*
PCT International Search Report and Written Opinion, Application No. PCT/US2020/042289, dated Oct. 1, 2020, 7 pps.

* cited by examiner

KEY VALUE FAULT INTERCEPTION INCLUDING SURROGATE RESPONSES

BACKGROUND

This disclosure relates generally to database fault prevention, and more specifically, to generating surrogate responses to prevent key value faults.

A prevalent communication pattern in computing systems is a client-server application programming interface (API), where any number of client computing devices may transmit requests to a host computing device, which generates a response to each received request. Each request (e.g., from the client computing device) and response (e.g., from the host computing device) pair includes a key value that matches the response to the request.

Key values are used to coordinate data across multiple computing devices. Examples of key values may include, in various implementations, user identifiers, account numbers, payment card numbers, primary account numbers, and the like. However, key values stored locally (e.g., at a client computing device) may become outdated, due to key values being updated and replaced at a remote, central data store. Outdated key values may lead to key data faults in which computing devices are unable to operate and process data, and also to database faults arising from attempts to retrieve data based on outdated key values.

Key value faults are a technical problem associated with the client-server API computing system communication pattern. For example, host computing devices may be unable to process requests including outdated key values. Further, client computing devices may be unable to process responses when a response includes a different or updated key value than the outdated key value sent in the request.

In one specific example, a client computing device (e.g., a merchant computing device) may store a primary account number (PAN) used to generate card-on-file (COF) payment transaction authorization requests, such as recurring monthly payments. The PAN may be compromised or may expire, and may therefore be replaced at the central issuer data store, causing the PAN stored locally at the client computing device to become outdated. Subsequently, authorization requests transmitted from the client computing device to a host computing device (e.g., a payment network computing device) that includes a locally stored outdated PAN may result in errors, such as rejection and/or decline of the authorization request.

Therefore, there is a need for a system configured to intercept requests (e.g., purchase transaction authorization requests, database requests) including outdated key values, and facilitate in-flight (e.g., continuous, during processing of the initial request) coordination between outdated and updated key values.

BRIEF DESCRIPTION

In one aspect, a fault intercepting computing device for converting between outdated and updated key values in messages processed by client and host computing devices is provided. The fault intercepting computing devices includes at least one processor in communication with at least one memory device, and is configured to receive a request message including an outdated key value from a client computing device. The fault intercepting computing device is further configured to retrieve an updated key value from a key mapping database by querying the key mapping database with the outdated key value, the updated key value mapped to the outdated key value in the key mapping database. The fault intercepting computing device generates a remapped request based on the request message by replacing the outdated key value with the updated key value in the request message. The fault intercepting computing device then transmits the remapped request to a host computing device, wherein the remapped request is configured to initiate a remote procedure on the host computing device, and the remote procedure is dependent on the updated key value. The fault intercepting computing device receives an initial response from the host computing device, including the updated key value, wherein the initial response is an output of the remote procedure initiated at the host computing device. In response, the fault intercepting computing device generates a surrogate response based on the initial response by replacing the updated key value with the outdated key value in the initial response. The fault intercepting computing device further appends a key remapped flag to the surrogate response, the key remapped flag indicating that the outdated key value is outdated and an updated key value is available. The fault intercepting computing device transmits the surrogate response, including the outdated key value and the key remapped flag, to the client computing device, wherein the outdated key value in the surrogate response enables the client computing device to match the surrogate response to the request message including the outdated key value.

In another aspect, a fault intercepting computing system for converting between outdated and updated key values in messages processed by client and host computing devices is provided. The fault intercepting computing system includes a key mapping database, storing updated primary account numbers (PANs) indexed by outdated PANs, a memory cache, wherein the memory cache is optimized for random data accesses and stores outdated PANs indexed by updated PANs, and a fault intercepting computing device, including at least one processor in communication with the memory cache and the key mapping database. The fault intercepting computing device is configured to receive an authorization request, including an outdated PAN from a client computing device, retrieve an updated PAN from the key mapping database by querying the key mapping database with the outdated PAN, the updated PAN mapped to the outdated PAN in the key mapping database, cache the outdated PAN in the memory cache using the updated PAN as the index, generate a remapped request based on the authorization request by replacing the outdated PAN with the updated PAN in the authorization request, and transmit the remapped request to a host computing device, and the remote procedure is dependent on the updated PAN. The fault intercepting computing device is further configured to receive an initial response from the host computing device, including the updated PAN, where the initial response is an output of the remote procedure initiated at the host computing device, retrieve outdated PAN from the memory cache, by querying the memory cache with the updated PAN, generate a surrogate response based on the initial response by replacing the updated PAN with the outdated PAN in the initial response, append a key remapped flag to the surrogate response, the key remapped flag indicating that the outdated PAN is outdated and an updated PAN is available, and transmit the surrogate response, including the outdated PAN and the key remapped flag, to the client computing device, wherein the outdated PAN in the surrogate response enables the client computing device to match the surrogate response to the authorization request including the outdated PAN.

In another aspect, a fault intercepting computing device for converting between outdated and updated PANs in messages processed by merchant and payment network computing devices is provided. The fault intercepting computing device includes at least one processor in communication with at least one memory device, and is configured to: receive a transaction authorization request message including an outdated PAN from a merchant computing device at which a payment transaction is initiated using the outdated PAN associated with a payment account, retrieve an updated PAN from a key mapping database by querying the key mapping database with the outdated PAN, generate a remapped authorization request message by replacing the outdated PAN with the updated PAN in the transaction authorization request message, and transmit the remapped authorization request message to a payment network computing device, wherein the remapped authorization request message is configured to initiate a payment transaction authorization procedure on the payment network computing device, and the payment transaction authorization procedure is dependent on the updated PAN. The fault intercepting computing device is further configured to receive a transaction authorization response from the payment network computing device including the updated PAN wherein the transaction authorization response is an output of the payment transaction authorization procedure initiated at the payment network computing device, generate a surrogate authorization response based on the transaction authorization response by replacing the updated PAN with the outdated PAN in the transaction authorization response, append a key remapped flag to the surrogate response, the key remapped flag indicating that the outdated PAN is outdated and an updated PAN is available, and transmit the surrogate authorization response, including the outdated PAN and the key remapped flag, to the merchant computing device, where the outdated PAN in the surrogate authorization response enables the merchant computing device to match the surrogate authorization response to the transaction authorization request message including the outdated PAN.

DETAILED DESCRIPTION

Figure 1:
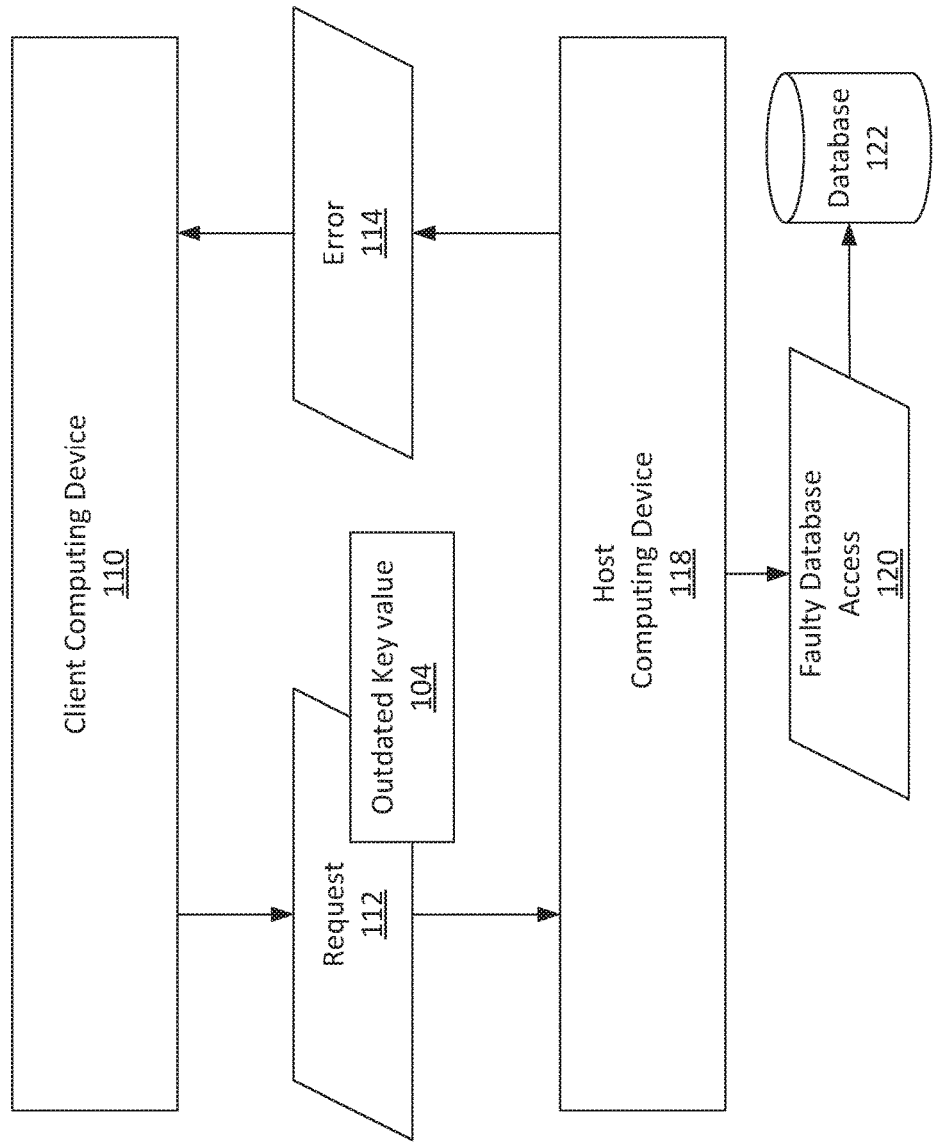
FIG. 1 is illustrates a known interaction between a client computing device and a host computing device.

The following detailed description illustrates embodiments of the disclosure by way of example and not by way of limitation. The description enables one skilled in the art to make and use the disclosure. It also describes several embodiments, adaptations, variations, alternatives, and uses of the disclosure, including what is presently believed to be the best mode of carrying out the disclosure.

There is a need for a system configured to intercept computer message requests (e.g., purchase transaction authorization requests, database requests) that include outdated key values, and facilitate in-flight (e.g., continuous, during processing of the initial request) replacement of outdated key values with updated key values.

Generally, a request message (also referred to herein as a "request") is sent from a client computing device to a host computing device. The request typically includes a key value and a function identifier that identifies a purpose of the request, such as a request for data or an action to be performed associated with the key value. In the example embodiment, an intermediary fault intercepting computing device is configured to intercept the request and analyze the request to determine whether the key value has been updated, changed, or replaced, or is otherwise faulty (e.g., does not match a key value at the destination host computing device). The fault intercepting computing device retrieves or receives the updated or new key value (e.g., from the host computing device, or a local database) and generates a remapped request that replaces the old, outdated key value with the new, updated key value. The fault intercepting computing device transmits the remapped request to the host computing device, which ensures proper processing of the remapped request at the host computing device. The host computing device returns an initial response to the fault intercepting computing device, including the updated key value and data responsive to the remapped request. The fault intercepting computing device generates a surrogate response including the data responsive to the remapped request and replaces the updated key value with the outdated key value. The surrogate response also includes an indicator or flag that the outdated key value is outdated, to notify the client computing device of the change in the data. The fault intercepting computing device transmits the surrogate response back to the client computing device.

Implementing the fault intercepting computing device as an intermediary in a client-server communication facilitates improved, more accurate data processing "in-flight" or "on-the-fly"—that is, during processing of the request. The request can therefore be processed in real-time as desired by a user of the client computing device, avoiding incurring data faults that could interrupt the request processing. Additionally, the client computing device is enabled by the fault intercepting computing device to successfully generate requests and receive responses including the outdated key value, while the underlying request (e.g., the remapped request) is processed using the updated key value known to the host computing device. The fault intercepting computing device also prevents faulty requests (e.g., outdated key values) from reaching the host computing device, which prevents errors and increases the processing throughput.

In one specific embodiment, the request includes a purchase transaction authorization request sent from a merchant computing device to a payment network computing device (e.g., a payment processor or an issuer computing device). For example, the purchase transaction authorization request is an ISO 8583 message formatted based on proprietary communication standards for the exchange of financial transaction data and settlement of funds between financial institutions that are members of a payment processing network. The purchase transaction authorization request includes a primary account number (PAN) as the key value, the PAN associated with an account used to initiate the purchase transaction. The payment network computing device, under normal circumstances, is configured to generate an authorization response including a completed authorization (i.e., approving the purchase transaction) or a decline based on a received PAN.

However, PAN values are frequently invalidated and replaced. For example, a compromised (e.g., lost or stolen) PAN may be replaced with an updated PAN value (that is, an updated key value) by an issuer of the payment account (e.g., an issuing bank). Accordingly, if the PAN received form the merchant by the payment network computing device is outdated, the payment network computing device may be unable to process the purchase transaction authorization request. The payment network computing device may therefore return a decline response message or may return an error message indicating the payment network computing device is unable to process the purchase transaction authorization request.

However, it may be insufficient for the payment network computing device to simply replace outdated key values with updated key values. Client computing devices may be unable to process responses including a different or updated key value. At least some computing devices may have unpredictable behavior in response to receiving a response with a different key value than the associated request. For example, the client computing device may be unable to determine the associated original request and/or update locally stored data, where the locally stored data is indexed based on the outdated key value. Moreover, the payment network computing device (e.g., payment processor) may not always have access to the updated key values. In such cases, as described above, the payment network computing device may be unable to process the request or generate an appropriate response.

Accordingly, there is a need for a system capable of facilitating successful operation of client computing devices using outdated key values until stored key values can be safely updated, as well as facilitating successful operation of payment network computing devices (or other server computing devices receiving requests from client computing devices) in responding to a request including outdated key values.

Keeping with the same example, if the payment network computing device recognizes the PAN is outdated and replaces the original, outdated PAN with the new, updated PAN in an authorization response, the merchant computing device may be unable to process the associated authorization response, as the key value has changed. In other words, there is a need for a system to both update key values in requests, and modify the associated responses to enable the client computing device to process the response.

Accordingly, the system disclosed herein includes a fault intercepting computing device. Generally, the fault intercepting computing device is configured to receive requests including outdated key values (e.g., faulty requests, key value faults), map the outdated key values to new or updated key values, and generate remapped requests that include updated key values. The remapped requests are then sent to the host computing device. Additionally, the fault intercepting computing device is configured to receive a response, including the updated key value, from the host computing device, replace the updated key value with the outdated key value, and generate a surrogate response including the outdated key value. In other words, the fault intercepting computing device receives the response to the remapped request, and translates it back such that the client computing device may process it.

More specifically, the fault intercepting computing device receives a faulty purchase transaction authorization request including an outdated PAN from a merchant computing device. The fault intercepting computing device determines if the faulty transaction authorization request is eligible for updating the key value. For example, the intercepting computing device may determine if a merchant identifier and/or the key value included in the faulty transaction authorization request is within a range of enabled values stored therein. The fault intercepting computing device may store lists and/or ranges of key values eligible for updating. In some embodiments, the fault intercepting computing device receives and stores key value ranges from an external data source, such as an issuing bank.

The fault intercepting computing device is configured to query a key mapping database with the outdated key value from the faulty transaction authorization request. Continuing with the example implementation described herein, the key mapping database maps outdated PAN values to updated PAN values. The key mapping database, in the example embodiment, is indexed using outdated key values, such that the database returns an updated key value when queried with an outdated key value. More specifically, the key mapping database may be optimized to accurately and rapidly determine if an updated key value exists for a given key value in a query. In other words, checking for an updated key value and retrieving an updated key value may be combined into one operation to better accommodate real-time translating or updating of these computer messages, so that the messages can be "remapped" or updated while they are being processed over the payment network.

The fault intercepting computing device then generates a remapped request by replacing the outdated PAN value in the faulty transaction authorization request with the updated PAN retrieved from the key mapping database. Generally, only the PAN is updated to maintain the intent of the original request. For example, data elements besides the PAN from the original transaction authorization request are included in the remapped request. The fault intercepting computing device then transmits the remapped request to the payment network computing device. The fault intercepting computing device may cache the key mapping, including the outdated and updated key values, in a random access memory (RAM). The cached key mapping may be subsequently used to generate surrogate responses, as described herein.

Subsequently, the fault intercepting computing device receives a purchase transaction authorization response from the payment network computing device. The response includes data responsive to the remapped request—and, therefore, includes the updated PAN. The response may be unsuitable for processing by the merchant computing device as the response includes the updated PAN. The fault intercepting computing device is configured to generate a surrogate response by replacing the updated PAN with the outdated PAN. In the example embodiment, the surrogate response is generated using the cached key mapping, without re-querying the key mapping database. In other embodiments, the fault intercepting computing device may query the key mapping database with the updated PAN to determine the outdated PAN. The surrogate response includes all the data (e.g., data elements) of the original transaction authorization response but for the PAN.

The outdated PAN, included in the surrogate response, enables the merchant computing device to correlate the surrogate response with the original transaction authorization request, such that the merchant computing device can properly process the surrogate response. In other words, the surrogate response is structured, from the perspective of the merchant computing device, as if the PAN was never updated.

In some embodiments, the fault intercepting computing device is also configured to append a flag to the original response from the host computing device in generating the surrogate response. Overall, the flag indicates (e.g., to the client computing device) the key value included in the original request was outdated, and was remapped before processing. For example, the flag may include an added data element or a modified data element value. As another example, the flag may include a portion of the updated key value (e.g., the last 4 digits of an updated PAN). In some embodiments, the flag may cause a supplemental key value updating process to be performed by the client computing device. However, the flag value is configured such that it does not disrupt normal response processing on client computing devices. In some embodiments, the client computing device may perform the supplemental key value updating process, including querying the fault intercepting computing device and/or the key mapping database to retrieve updated key values, in response to receiving a response including such a flag.

The technical problems addressed by the disclosure include at least one of: (i) inability to process requests including outdated key values, (ii) data corruption from processing requests including outdated key values, (iii) data corruption from receiving responses including different (e.g., updated) key values, (iv) inability to process responses including updated key values, and (v) data security risks associated transmitting updated key values.

The resulting technical benefits achieved by the systems and methods of the disclosure include at least one of: (i) reduced database faults, including key value errors, (ii) reduced request processing time at host computing device due to intercepting faulty requests, (iii) data corruption prevented by identifying requests including outdated key values, and (iv) ability to process requests using updated key values, while providing the response to the client computing device using the known outdated key value.

In one aspect, a fault intercepting computing device for converting between outdated and updated key values in messages processed by client and host computing devices is provided. The fault intercepting computing devices includes at least one processor in communication with at least one memory device, and is configured to receive an authorization request, from a client computing device, including an outdated key value, a function identifier identifying a purpose of the authorization request, and at least one request data element. The client computing device may generate the authorization request using a locally stored key value, which may become outdated. The fault intercepting computing device is further configured to retrieve an updated key value from a key mapping database by querying the key mapping database with the outdated key value, the updated key value mapped to the outdated key value in the key mapping database. The key mapping database is indexed by outdated key values, to enable rapid retrieval of updated key values when queried with an outdated key value. The fault intercepting computing device generates a remapped request based on the authorization request by replacing the outdated key value with the updated key value in the authorization request, the remapped request including the updated key value, the function identifier, and the at least one request data element of the authorization request. Overall, the remapped request maintains the purpose of the authorization request, but includes the updated key value. The fault intercepting computing device then transmits the remapped request to a host computing device, wherein the function identifier of the remapped request is configured to initiate a remote procedure on the host computing device, and the remote procedure is dependent on the updated key value. For example, the remote procedure may include a transaction authorization process, which may not accept an outdated key value. The fault intercepting computing device receives an initial response from the host computing device, including the updated key value and at least one response data element, wherein the response is an output of the remote procedure initiated at the host computing device using the function identifier. In other words, the response received from the host computing device includes the updated key value, and thus it may be unsuitable for processing by the client computing device. In response, the fault intercepting computing device generates a surrogate response based on the initial response by replacing the updated key value with the outdated key value in the initial response, the surrogate response including the at least one response data element and the outdated key value. The fault intercepting computing device further appends a key remapped flag to the surrogate response, the key remapped flag indicating that the outdated key value is outdated and an updated key value is available. The surrogate response then maintains the response data element but includes the outdated key value stored by the client computing device. The fault intercepting computing device transmits the surrogate response, including the outdated key value, the at least one response data element, and the key remapped flag, to the client computing device, wherein the outdated key value in the surrogate response enables the client computing device to match the surrogate response to the authorization request including the outdated key value.

In some embodiments, the fault intercepting computing device is configured to maintain a key value cache in the memory. More specifically, the fault intercepting computing device may cache, after retrieving the updated key value, the retrieved updated key value and the outdated key value in the at least one memory device, and retrieve, after receiving the response from the host computing device, the outdated key value by querying the cached values in the at least one memory device, to enable generating the surrogate response. In other embodiments, the fault intercepting computing device is configured to directly identify a memory location in the key mapping database of the updated key value using the outdated key value.

In some embodiments, the fault intercepting computing device causes a supplemental update process to be initiated at client computing devices, or indicates to the client computing device that such a supplemental update process is required, enabling client computing devices to update locally stored key values. More specifically, the key remapped flag may automatically initiate the supplemental update process on the client computing device. The fault intercepting computing device is configured to receive update requests from the client computing device, including the outdated key value. In response, the fault intercepting computing device may retrieve the updated key value by querying the cached values with the outdated key value, and transmit the updated key value to the client computing device in a supplemental update response to enable the client computing device to update the locally store outdated key value. In alternate embodiments, the fault intercepting computing device retrieves the updated key value from the key mapping database before transmitting updated key value to the client computing device. The key remapped flag may include the last four digits of the key value, to enable the client computing device to verify the updated key value by comparing the updated key value to the key remapped flag.

In some embodiments, the memory may include an enabled prefix range, which defines key values eligible for updating. The fault intercepting computing device determines that outdated key values are eligible for updating by comparing the prefix of an outdated key value to the enabled prefix range.

In some embodiments, the fault intercepting computing device may process requests including primary account numbers as the key values, where the primary account numbers are associated with payment accounts used initiate payment card transactions at the client computing device. For example, an updated and outdated key value may be associated with the same payment account. The fault intercepting computing device may be further configured to receive outdated and updated primary account numbers from an issuer data source. The issuer data source may generate updated primary account numbers to replace primary account numbers compromised due to theft or fraud. The fault intercepting device is configured to store outdated and updated primary account numbers received from the issuer data source in the key mapping database, with the outdated primary account number as the index.

In another aspect, a fault intercepting computing system for converting between outdated and updated key values in messages processed by client and host computing devices is provided. The fault intercepting computing system includes a key mapping database, storing updated primary account numbers (PANs) indexed by outdated PANs, a memory cache, wherein the memory cache is optimized for random data accesses and stores outdated PANs indexed by updated PANs, and a fault intercepting computing device, including at least one processor in communication with the memory cache and the key mapping database. The fault intercepting computing device is configured to receive an authorization request, from a client computing device, including an outdated PAN, a function identifier identifying a purpose of the authorization request, and at least one request data element, wherein the outdated PAN is stored in a local memory of the client computing device, retrieve an updated PAN from the key mapping database by querying the key mapping database with the outdated PAN, the updated PAN mapped to the outdated PAN in the key mapping database, cache the outdated PAN in the memory cache using the updated PAN as the index, generate a remapped request based on the authorization request by replacing the outdated PAN with the updated PAN in the authorization request, the remapped request including the updated PAN, the function identifier and the at least one request data element of the authorization request, and transmit the remapped request to a host computing device, wherein the function identifier of the remapped request is configured to initiate a remote procedure on the host computing device, and the remote procedure is dependent on the updated PAN. The fault intercepting computing device is further configured to receive an initial response from the host computing device, including the updated PAN and at least one response data element, where the response is an output of the remote procedure initiated at the host computing device by the function identifier, retrieve outdated PAN from the memory cache, by querying the memory cache with the updated PAN, generate a surrogate response based on the response by replacing the updated PAN with the outdated PAN in the initial response, the surrogate response including the at least one response data element and the outdated PAN, append a key remapped flag to the surrogate response, the key remapped flag indicating that the outdated PAN is outdated and an updated PAN is available, and transmit the surrogate response, including the outdated PAN, the at least one response data element, and the key remapped flag, to the client computing device, wherein the outdated PAN in the surrogate response enables the client computing device to match the surrogate response to the authorization request including the outdated PAN.

In some embodiments, the key remapped flag is configured to automatically initiate a supplemental update process on the client computing device. The fault intercepting computing device may be configured to receive, in response to the supplemental update process initiated on the client computing device, an update request from the client computing device including the outdated PAN, retrieve, in response to the update request, the updated PAN by querying the memory cache with the outdated PAN and transmit the updated PAN to the client computing device in a supplemental update response to enable the client computing device to update the locally stored outdated PAN as part of the supplemental update process. In one embodiment, the key remapped flag of the surrogate response includes the last four digits of the updated PAN, to enable the client computing device to verify the updated PAN by comparing the updated PAN to the flag.

In some embodiments, the memory cache further stores an issuer prefix range, which defines PANs eligible for updating. The fault intercepting computing device may be further configured to determine that the outdated PAN is eligible for updating, by comparing an issuer prefix of the outdated PAN to the issuer prefix range.

In some embodiments, the key mapping database is configured to retrieve updated PANs using outdated PANs in a consistent amount of time across queries using the updated PANs as indexes. More specifically, the key mapping database may be indexed by outdated PANs to enable the fault intercepting computing device to directly identify a memory location in the key mapping database of the updated PANs.

In some embodiments, the fault intercepting computing device is configured to receive updated PANs from an issuer data source. The fault intercepting computing device may receive the outdated PAN and the updated PAN from the issuer data source, where the updated PAN was generated by the issuer data source to replace the outdated PAN, and store the updated PAN in the key mapping database with the outdated PAN as the index.

In another aspect, a fault intercepting computing device for converting between outdated and updated PANs in messages processed by merchant and payment network computing devices is provided. The fault intercepting computing device includes at least one processor in communication with at least one memory device, and is configured to receive a transaction authorization request message, from a merchant computing device at which a payment transaction is initiated using an outdated PAN associated with a payment account, the transaction authorization request message including the outdated PAN, an authorization request function identifier, a merchant identifier from the merchant computing device, and a transaction amount, wherein the outdated PAN is stored in a local memory of the merchant computing device, retrieve an updated PAN from a key mapping database by querying the key mapping database with the outdated PAN, generate a remapped authorization request message based on the transaction authorization request message by replacing the outdated PAN with the updated PAN in the transaction authorization request message, the remapped authorization request message including the updated PAN, the authorization request function identifier, the merchant identifier, and the transaction amount of the transaction authorization request message, and transmit the remapped authorization request message to a payment network computing device, wherein the authorization request identifier of the remapped authorization request message is configured to initiate a payment transaction authorization procedure on the payment network computing device, and the payment transaction authorization procedure is dependent on the updated PAN. The fault intercepting computing device is further configured to receive a transaction authorization response from the payment network computing device, including the updated PAN and a response code, wherein the transaction authorization response is an output of the payment transaction authorization procedure initiated at the payment network computing device using the authorization request identifier, generate a surrogate authorization response based on the transaction authorization response by replacing the updated PAN with the outdated PAN in the transaction authorization response, the surrogate response including the response code of the transaction authorization response, append a key remapped flag to the surrogate response, the key remapped flag indicating that the outdated PAN is outdated and an updated PAN is available, and transmit the surrogate authorization response, including the outdated PAN, the response code, and the key remapped flag, to the merchant computing device, where the outdated PAN in the surrogate authorization response enables the merchant computing device to match the surrogate authorization response to the transaction authorization request message including the outdated PAN.

In some embodiments, the fault intercepting computing device is configured to cache updated PANs retrieved from the key mapping database, for subsequent retrieval while generating surrogate responses. The fault intercepting computing device may be configured to cache, after retrieving the updated PAN, the retrieved updated PAN and the outdated PAN in the at least one memory device, and retrieve, after receiving the authorization response from the payment network computing device, the outdated PAN by querying the cached values in the at least one memory device, to enable generating the surrogate response. In other embodiments, the fault intercepting computing device is configured to directly identify a memory location in the key mapping database of the updated key value using the outdated key value.

In some embodiments, the fault intercepting computing device provides a supplemental update process to merchant computing devices. The fault intercepting computing device may be configured to receive, in response to the supplemental update process initiated on the merchant computing device, an update request from the merchant computing device including the outdated PAN, retrieve, in response to the update request, the updated PAN by querying the at least one memory device with the PAN, and transmit the updated PAN to the merchant computing device in a supplemental update response to enable the merchant computing device to update the locally stored outdated PAN as part of the supplemental update process. The key remapped flag of the surrogate response may include the last four digits of the updated PAN, to enable the merchant computing device to verify the updated PAN by comparing the updated PAN to the key remapped flag.

In some embodiments, the fault intercepting computing device stores an issuer prefix range, which defines PANs eligible for updating. The fault intercepting computing devices is configured to determine that the outdated PAN is eligible for updating, by comparing an issuer prefix of the outdated PAN to the issuer prefix range.

In some embodiments, the fault intercepting computing device receives updated PANs from an issuer data source. The fault intercepting computing device may receive the outdated PAN and the updated PAN from an issuer data source, wherein the updated PAN was generated by the issuer data source to replace the outdated PAN, and store the updated PAN in the key mapping database with the outdated PAN as an index.

In one embodiment, a computer program is provided, and the program is embodied on a computer-readable medium. In an example embodiment, the system is executed on a single computer system, without requiring a connection to a server computer. In a further example embodiment, the system is run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Apple Inc. located in Cupertino, Calif.). In yet a further embodiment, the system is run on a Mac OS® environment (Mac OS is a registered trademark of Apple Inc. located in Cupertino, Calif.). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer-readable medium and utilizes a Structured Query Language (SQL) with a client user interface front-end for administration and a web interface for standard user input and reports. In another embodiment, the system is web enabled and is run on a business entity intranet. In yet another embodiment, the system is fully accessed by individuals having an authorized access outside the firewall of the business-entity through the Internet. In a further embodiment, the system is being run in a Windows® environment (Windows is a registered trademark of Microsoft Corporation, Redmond, Wash.). The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus, are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database implementation (e.g., relational, document-based) may be used that enables the system and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

FIG. 1 is a prior art figure illustrating a client computing device 110 in communication with a host computing device 118. Client computing device 110 uses an application programming interface (API) to initiate remote procedures (e.g., retrieving data, modifying data) on host computing device 118.

In the example embodiment, host computing device 118 is a component of a payment network that processes payment transactions, and client computing device 110 is a merchant computing device that initiates payment transactions for processing over the payment network. Host computing device 118 may provide a payment network API to client computing device 110. Client computing device 110 may implement the payment network API to initiate the payment transactions, and more specifically, to generate purchase transaction authorization requests. In one embodiment, host computing device 118 may be a payment network computing device configured to route payment card transactions to issuer computing devices. In another embodiment, host computing device 118 may be an issuer computing device, configured to authorize payment card transactions and generate authorization responses.

In another embodiment, host computing device 118 provides a web API where the key values include user identifiers (e.g., employee numbers). Client computing device 110 may generate requests including outdated user identifiers, causing unpredictable behavior by host computing device 118.

In the example embodiment, requests (e.g., a request 112) include at least one key value as described above. The key values are used by host computing device 118, and a database 122, to retrieve and/or access existing data records. For example, a key value may uniquely identify a database record stored at database 122. In other words, key values identify the data to be retrieved and/or modified, instead of defining search terms to retrieve potential matches. As a consequence, incorrect key values can cause a critical error. At least some database systems (e.g., database 122) are optimized to retrieve data based on key values. For example, database 122 may include a key index, mapping key values to memory locations. For at least these reasons, incorrect (e.g., outdated) key values may cause a critical error. In some embodiment, host computing device 118 may identify that a received key value is an incorrect key value (e.g., a valid but unintended key is used). However, in other embodiments in which host computing device 118 is unable to identify the incorrect key value, data or process corruption may occur.

In some embodiments, request 112 may include a function identifier, indicating a remote procedure to be initiated at host computing device 118. The function identifier may be a request method, endpoint identifier, remote procedure call, and the like. In one embodiment, the function identifier may be a data element indicating the type and/or class of the request (e.g., a purchase transaction authorization request).

In known systems, client computing device 110 may store key values used in generating request 112, and the stored key values may become outdated. For example, a key value may be compromised and need to be replaced. Client computing device 110 generates request 112 including an outdated key value 104. Outdated key value 104 may be a primary account number (PAN) associated with a payment card or a tokenized PAN. Client computing device 110 transmits request 112 to host computing device 118. Request 112 may be transmitted over the interne, a private network (e.g., a virtual private network), or any other data network.

Host computing device 118 initiates processing of request 112. In the example embodiment, host computing device 118 uses outdated key value 104 from request 112 to initiate a database access 120. Faulty database access 120 includes outdated key value 104, and is transmitted to database 122. Faulty database access 120 may result in an error or other unexpected behavior by database 122 and/or host computing device 118. For example, unintended data may be returned, potentially compromising the security of that data. As another example, database 122 may return an error, preventing further processing of the request 112.

In some embodiments, where request 112 includes a function identifier, host computing device 118 may process request 112 by initiating a procedure identified by the function identifier. In one embodiment, the function identifier may include a HTTP request method, such as GET to retrieve data, POST to create data, PUT to update data, DELETE to delete data. In another embodiment, the function identifier may include a message type indicator, as defined by International Organization for Standardization (ISO) standard 8583. For example, the function identifier may indicate request 112 is an authorization request and initiate an authorization process on host computing device 118.

Overall, host computing device 118 is unable to successfully process request 112 because of the outdated key value 104. In the example embodiment, an error 114 is returned to client computing device 110 as a response to request 112. In other embodiments, host computing device 118 may transmit incorrect (e.g., unintended) data to client computing device 110, causing further data processing errors.

In high volume and distributed computing systems, incorrect/outdated key values may significantly reduce processing throughput of requests while potentially compromising stored data. Further, client computing device 110 may be dysfunctional due to the outdated key values. Overall, outdated key values compromise the entire system, from potential data corruption at the host computing device 118 to reduced functionality at client computing device 110.

There is a need for a system configured to provide fault tolerance for outdated key values at both client computing device 110 and host computing device 118.

Figure 2:
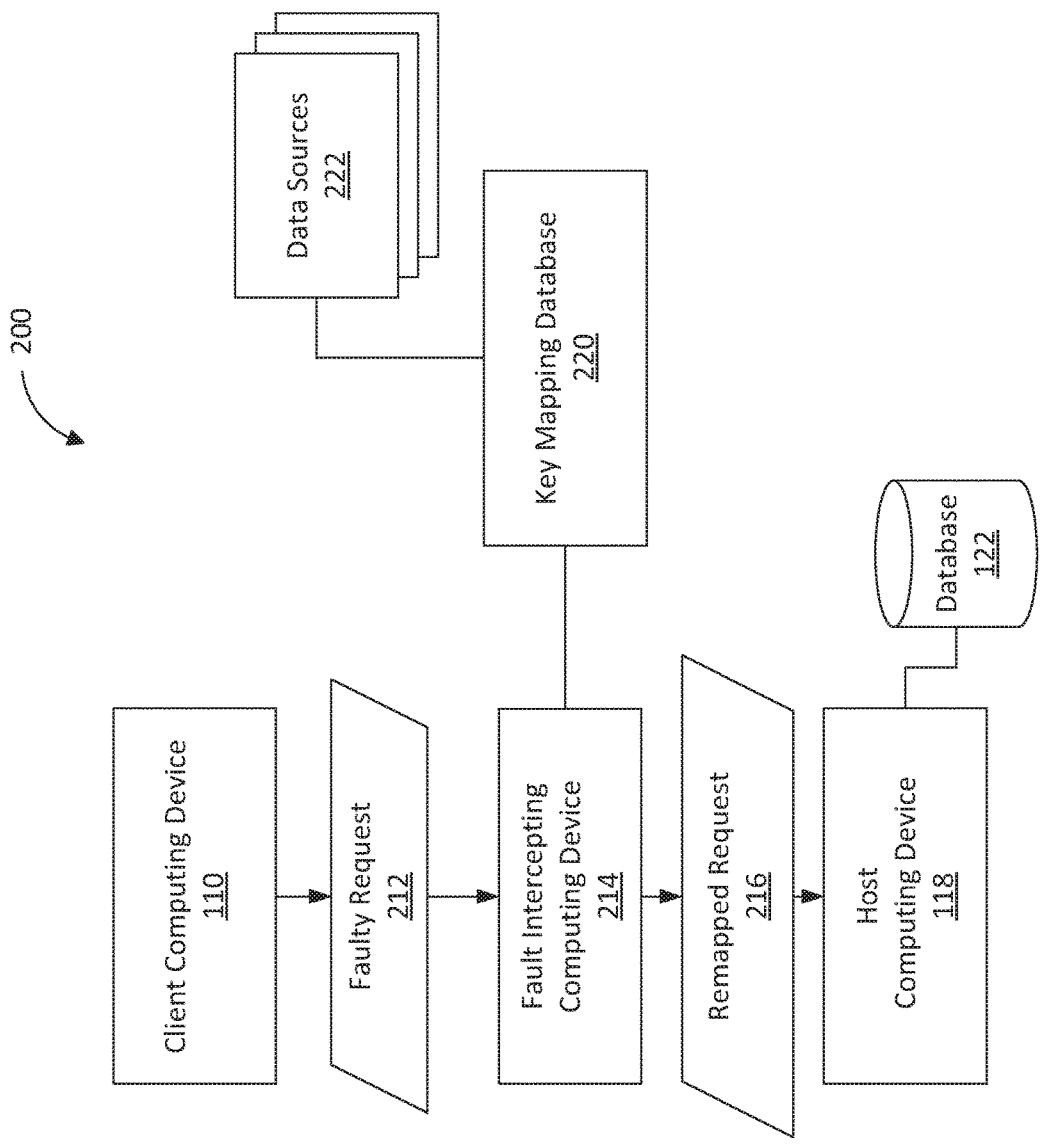
FIG. 2 is a data flow diagram illustrating an example fault intercepting computing device receiving a faulty request and generating a remapped request.

FIG. 2 is a data flow diagram illustrating an example fault intercepting computing system 200 receiving a faulty request and generating a remapped request in accordance with the present disclosure. Fault intercepting computing system 200 includes, at least, a fault intercepting computing device 214 and a key mapping database 220. Fault intercepting computing device 214 receives a faulty request 212 from client computing device 110. In the example embodiment, faulty request 212 includes an outdated key value, such as an outdated primary account number (PAN). The outdated key value may be stored locally on client computing device 110, where it may not be directly updated (e.g., client computing device 110 may not have access to a central data store where the key value is updated).

Fault intercepting computing device 214 is configured to intercept faulty request 212 and generate a remapped request 216. More specifically, fault intercepting computing device 214 identifies at least one key value for which an update may be available (e.g., an outdated key value). In the example embodiment, fault intercepting computing device 214 may filter faulty request 212 for primary account numbers (PANs). In certain embodiments, fault intercepting computing device 214 stores rules for determining which key values (e.g., PANs) are potential key values for updating. More specifically, ranges of key values may be specified. For example, fault intercepting computing device 214 may store issuer identification numbers (IINs) identifying ranges of PANs using a prefix. For example, a stored IIN may define a range of PANs with a certain prefix (e.g., the first four digits) eligible for updating. Alternatively, fault intercepting computing device 214 may store lists of PANs eligible for updating. The IINs and/or PAN lists may be received from data sources 222, such as issuing banks.

Fault intercepting computing device 214 is configured to query key mapping database 220 with the identified outdated key values (e.g., potentially outdated PANs). Key mapping database 220 includes key-value pairs, and maps between key values. For example, outdated key values are mapped to updated key values. In other words, for each candidate key value, zero to one updated key values exist in key mapping database 220. In other embodiments, multiple updated key values may be stored in key mapping database 220. Key mapping database 220 is indexed using outdated key values, such that fault intercepting computing device 214 can directly access (e.g., determine a memory location of) updated key values using outdated key values. In other words, key mapping database 220 is configured to retrieve updated key values using outdated key values in a consistent amount of time across queries.

Fault intercepting computing device 214, in communication with key mapping database 220, is configured to centrally remap outdated key values to updated key values. Key mapping database 220 may be in communication with any number of data sources 222 to receive updated key values.

In some embodiments, data sources 222 may connect to fault intercepting computing device 214 to transmit key value mappings (e.g., provide updated key values). In other embodiments, fault intercepting computing device 214 connects to any number of data sources 222 to retrieve key value mappings. For example, fault intercepting computing device 214 may query a payment card issuer data source to retrieve updated PANs (e.g., updated key values). In the example embodiment, key mapping database 220 is populated using data sources 222 (e.g., payment card issuers). In other embodiments, key mapping database 220 is maintained by payment card issuers, and is remotely accessed by fault intercepting computing device 214.

Overall, fault intercepting computing device 214 queries key mapping database 220 with an outdated key value included in faulty request 212 to retrieve an updated key value. Fault intercepting computing device 214 then generates remapped request 216, including the retrieved updated key value. In other words, fault intercepting computing device 214 may automatically replace outdated key values (e.g., PANs) in requests with updated key values.

Figure 3:
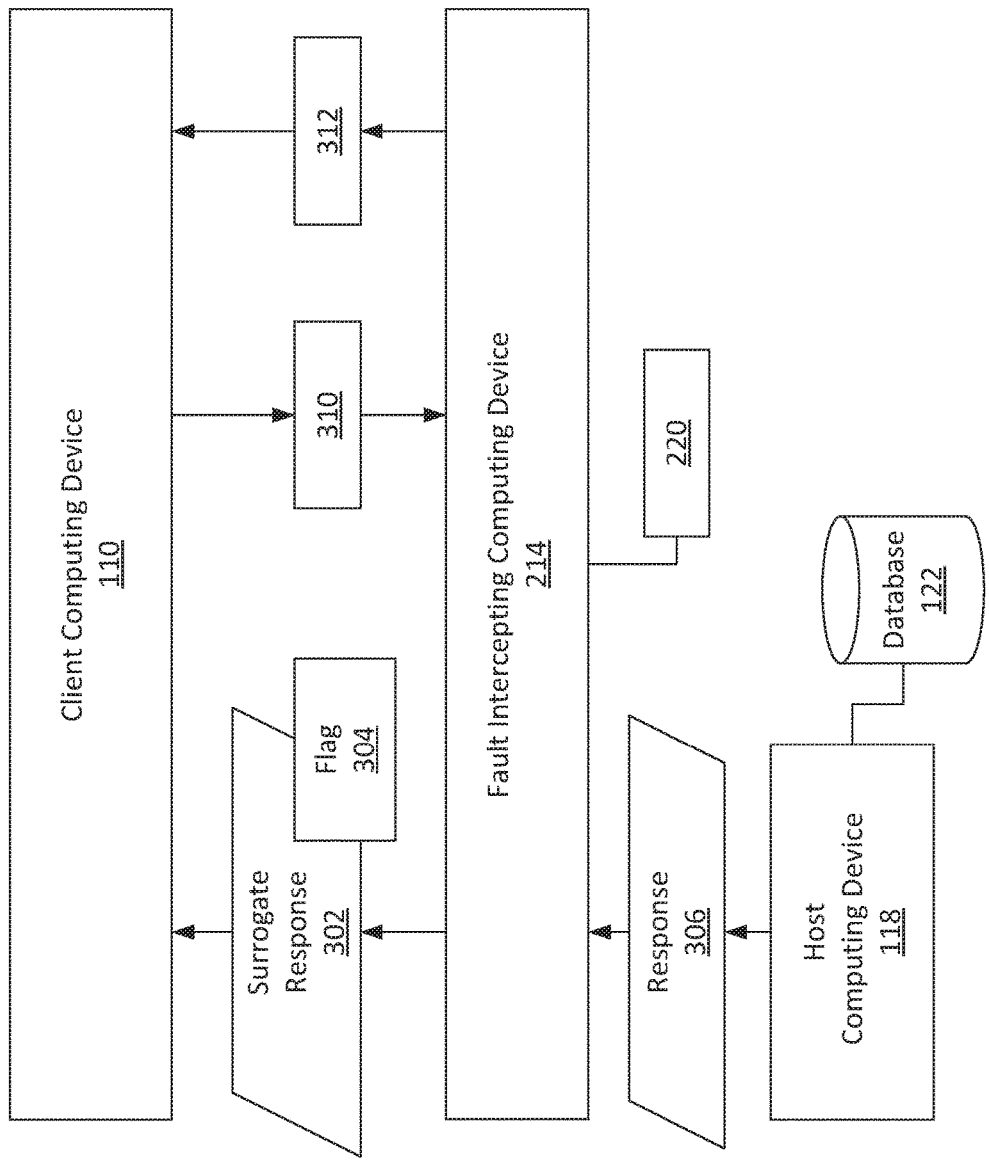
FIG. 3 is a data flow diagram illustrating the example fault intercepting computing device of FIG. 2 receiving a response and generating a surrogate response.

In certain embodiments, fault intercepting computing device 214 may cache the outdated and updated key values in a memory, such as a random access memory. The cached outdated and updated key values may be subsequently used while generating a surrogate response, as illustrated in FIG. 3.

Fault intercepting computing device 214 is configured to modify faulty request 212 before faulty request 212 is processed by host computing device 118. That is, fault intercepting computing device intercepts faulty request 212. Additionally, fault intercepting computing device 214 functions without alterations to the behavior of client computing device 110. In other words, fault intercepting computing device 214 may intercept purchase transaction authorization requests (or other requests) before they are processed for authorization, without requiring direct interaction with or intervention from a merchant, such as client computing device 110.

In the example embodiment, remapped request 216 is generated "in-flight" after fault intercepting computing device 214 receives faulty request 212 (e.g., within 0.1 to 3 seconds) such that data processing is not delayed and client computing device 110 may function as normal. In other words, fault intercepting computing device 214 is configured to generate remapped request 216 within the timeframe client computing device 110 would expect faulty request 212 to normally be processed. This prevents disruptions in data processing, and the accumulation of unprocessed requests.

Fault intercepting computing device 214 instructs key mapping database 220 to index key values stored in, to facilitate rapid generation of remapped request 216. For example, fault intercepting computing device 214 may direct key mapping database 220 to build an index (e.g., a tree data structure) to allow for updated key values to be retrieved rapidly when given a specific outdated key value. In certain embodiments, key mapping database 220 may be a data storage device where updated key values are stored in a memory location/address defined by the associated outdated key value. For example, the memory location of updated key values may be based on a hash of the associated outdated key value. In response to identifying an outdated key value, fault intercepting computing device 214 may then directly access the memory location storing the updated key value by applying the hash function to the identified outdated key value. Overall, key mapping database 220 is optimized for the storage of pairs of outdated and updated key values, and the database is indexed based on the outdated key values.

More specifically, key mapping database 220 includes a specialized structure (e.g., outdated key value-indexed, key value mapping lookup-optimized) to accommodate high volume and rapid processing of faulty requests. In other words, fault intercepting computing device 214, in communication with key mapping database 220, is optimized to rapidly determine an updated key value for a faulty request.

Fault intercepting computing device 214 generates remapped request 216 based on the updated key value retrieved from key mapping database 220. In other words, fault intercepting computing device 214 replaces outdated key in faulty request 212 with updated key values to generate remapped request 216. In certain embodiments, fault intercepting computing device 214 further modifies faulty request 212 such that host computing device 118 directs any responses to fault intercepting computing device 214 for further processing as shown in FIG. 3. For example, remapped request 216 includes a specific data element that, upon being processed by host computing device 118, causes host computing device 118 to return a response to remapped request to fault intercepting computing device 214. Fault intercepting computing device 214 then transmits remapped request 216 to host computing device 118. Host computing device 118 then processes remapped request 216 based on the updated (e.g., valid) key values, and generates responses as shown in FIG. 3. For example, host computing device 118 queries database 122 based on the updated key values, where the outdated key values would have caused faults in database 122.

FIG. 3 is a data flow diagram illustrating the example fault intercepting computing device 214 receiving a response and generating a surrogate response.

Host computing device 118 generates at least one response 306 in response to remapped request 216 (shown in FIG. 2). Response 306 includes, in the example embodiment, data retrieved from database 122 based on the updated key value included in remapped request 216. That is, response 306 is response to request 216. In certain embodiments, response 306 may include a payment card authorization response.

Fault intercepting computing device 214 generates surrogate response 302 based on response 306 such that client computing device 110 may identify surrogate response 302 as associated with faulty request 212 (shown in FIG. 2). In other words, fault intercepting computing device 214 may insert the outdated key value back into response 306 such that the key value in surrogate response 302 is consistent with the outdated key value stored by client computing device 110.

In the example embodiment, fault intercepting computing device 214 replaces the updated key value in response 306 with the outdated key value from request 212. In other words, surrogate response 302 includes the key value of faulty request 212 and also includes data from response 306. In certain embodiments, the outdated key value/values are appended to response 306, instead of replacing the key values.

The outdated key value may be retrieved from a cache, such as a random access memory (RAM) cache. The outdated key value, and associated key value, may have been previously cached during the generation of remapped request 216, as shown in FIG. 2. In other embodiments, fault intercepting computing device 214 may query key mapping database 220 with the updated key value to retrieve the outdated key value.

In the example embodiment, surrogate response 302 also includes key remapped flag 304. Flag 304 indicates to client computing device 110 that key values were remapped by fault intercepting computing device 214 to avoid a key value fault. Flag 304 is configured such that it may be safely ignored by client computing devices without knowledge of fault intercepting computing device 214. However, flag 304 is configured such that certain client computing devices (e.g., client computing device 110) may receive flag 304 and automatically begin updating locally stored key values. In one embodiment, flag 304 is configured to cause client computing device 110 to query fault intercepting computing device 214 and/or key mapping database 220 to update any number of stored key values, to reduce the number of locally stored outdated key values. In certain embodiments, in response to receiving surrogate response 302 including flag 304, client computing device 110 may request updated key values from fault intercepting computing device 214 and/or key mapping database 220. In one embodiment, in response to receiving flag 304, client computing device 110 may transmit an update request 310 to fault intercepting computing device 214 including the outdated key value. Fault intercepting computing device 214 may generate an update response 312 including the updated key value.

Flag 304 may include a portion of the updated key value, to validate the updated key value received in the update response. For example, flag 304 may include the last four digits of the updated key value. Client computing device 110 may compare the updated key value in update response 312 to flag 304 (received in surrogate response 302) to verify the locally stored key value has been properly updated, and determine that the data fault indicated by flag 304 has been resolved. In another embodiment, client computing device 110 may prompt a user for an updated key value in response to receiving flag 304, and the portion of the updated key value may be used to validate a key value received from a user.

In other embodiments, in response to receiving surrogate response 302 including flag 304, client computing device 110 is configured to prompt a user for an updated key value. Flag 304 may include a portion of the updated key value to validate a new key value provided by the user.

Figure 4:
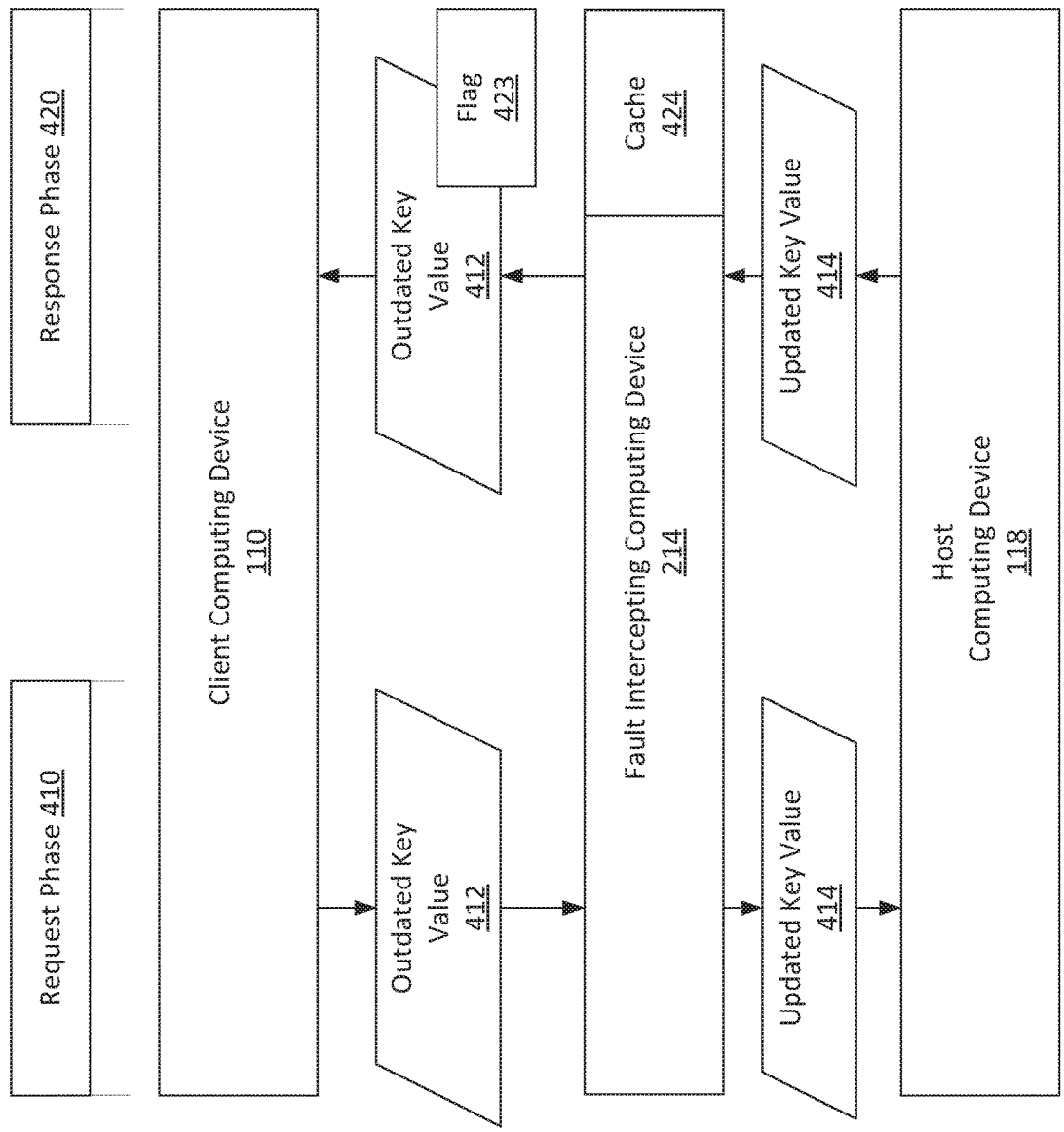
FIG. 4 is a data flow diagram illustrating the fault intercepting computing device of FIG. 2 in communication with a client computing device and a host computing device.

FIG. 4 is a data flow diagram illustrating the fault intercepting computing device 214 of FIG. 2. More specifically, FIG. 4 illustrates how fault intercepting computing device 214 uses outdated key values and updated key values.

Request phase 410 includes fault intercepting computing device 214 receiving an outdated key value 412 from client computing device 110, and transmitting an updated key value 414 to host computing device 118. As shown in FIG. 2, fault intercepting computing device 214 uses key mapping database 220 to determine updated key value 414. In other words, fault intercepting computing device 214 updates and "remaps" requests to include updated key values such that they may be processed by host computing device 118 without causing a database fault (e.g., key value error, indexing error).

In some embodiments, fault intercepting computing device 214 includes a cache 424. Cache 424 may be stored on random access memory (RAM) devices integral to or connected to fault intercepting computing device 214, to enable low latency access of stored data. Fault intercepting computing device 214 stores outdated key value 412 and updated key value 414 in cache 424. Cache 424 may store any number of outdated and updated key value pairs. More specifically, cache 424 is configured to rapidly respond with cached outdated key values (e.g., outdated key value 412) when queried with updated key values (e.g., updated key value 414). In the example embodiment, fault intercepting computing device 214 caches outdated key value 412 during request phase 410 (e.g., while generating a remapped request), and retrieves outdated key value 412 from cache 424 during a response phase 420 (e.g., while generating a surrogate response).

Response phase 420 automatically starts when fault intercepting computing device 214 receives a response (e.g., response 306 shown in FIG. 3) including updated key value 414. In the example embodiment, host computing device 118 cannot directly respond to client computing device 110 due to client computing device 110 operating based on outdated key value 412.

In the example embodiment, updated key value 414 is replaced with outdated key value 412 in response phase 420. Specifically, fault intercepting computing device 214 inserts outdated key value 412 into the response (e.g., response 306 shown in FIG. 3) received from host computing device 118. Outdated key value 412 is transmitted to client computing device 110 in surrogate response 302 (shown in FIG. 3). In other embodiments, updated key value 414 may be additionally provided to client computing device 110 (e.g., in surrogate response 302 or in a separate response).

In addition to providing outdated key value 412 to client computing device 110, fault intercepting computing device 214 further includes flag 423 in surrogate response 302, to indicate to client computing device 110 that fault intercepting computing device 214 determined outdated key value 412 received from client computing device 110 was outdated and was subsequently remapped before processing. Flag 423 is appended to surrogate response 306 such that surrogate response 306 does not require specialized processing. In other words, client computing device 110 may or may not be configured to identify/process flag 423. In certain embodiments, client computing device 110 may initiate a key value updating process in response to receiving or processing flag 423.

In some embodiments, flag 423 includes updated key value 414 or, alternatively, a portion of updated key value 414. In such embodiments, flag 423 may be used by client computing device 110 to update locally stored key values, such as outdated key value 412.

In one embodiment, where updated key value 414 includes confidential data, flag 423 may include a portion of updated key value 414 to be used by client computing device 110 to determine that outdated key value 412 has been properly updated. For example, in response to flag 423, client computing device 110 may prompt a user for updated key value 414, and compare it to the portion thereof included in flag 423 for validation.

In another embodiment, flag 423 includes updated key value 414, and client computing device 110 replaces locally stored outdated key value 412 with updated key value 414.

Figure 5:
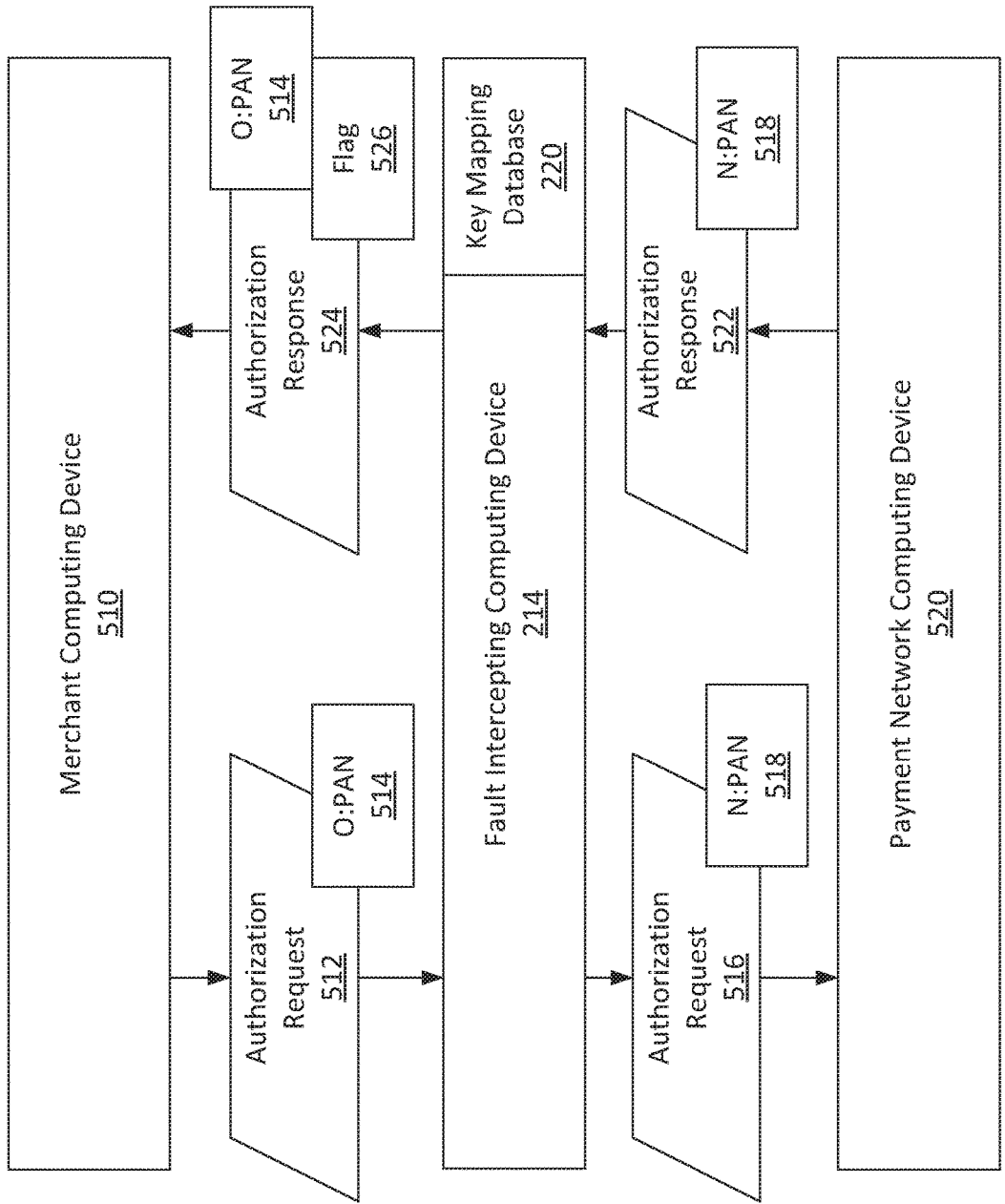
FIG. 5 is a data flow diagram illustrating the example fault intercepting computing device of FIG. 2 in communication with a payment network computing device and a merchant computing device.

FIG. 5 is a data flow diagram illustrating the example fault intercepting computing device 214 in communication with a payment network computing device 520 and a merchant computing device 510.

In one embodiment, fault intercepting computing device 214 is a component of a payment network processing payment card transactions (e.g., purchase transaction authorization requests, authorization responses).

Fault intercepting computing device 214 receives transaction authorization requests, including card-on-file (COF) transactions, from merchant computing device 510. Authorization request 512 may be received in response to a payment transaction being initiated at merchant computing device 510 using an outdated PAN. Authorization request 512 includes a PAN, used as a key value for the authorization request 512. For example, merchant computing device 510 may periodically initiate COF payment transactions based on locally stored PANs. Such COF payment transactions may include monthly recurring transactions, such as gym memberships, utility bill payments, recurring charitable donations, and the like. PANs may be periodically replaced due to theft, expiration, or loss. Thus, the PANs stored by merchant computing device 510 and used to initiate COF transactions may become outdated. For example, a user's payment card may be lost or stolen, triggering an issuer of the PAN (e.g., an issuing bank) to generate a replacement PAN. As another example, a PAN may expire and be replaced periodically. Overall, outdated PANs are generally associated with replacement or new PANs.

In one embodiment, authorization request 512 is identified as a COF by a data element included therein. More specifically, authorization request 512 is an ISO 8583 message (or other specialized transaction message) and includes a data element with the index "DE 22-1" and the value "10".

Authorization request 512 includes an outdated PAN ("O:PAN") 514. In certain embodiments, fault intercepting computing device 214 is configured to determine if O:PAN 514 is outdated and/or is eligible for updating. For example, fault intercepting computing device 214 may determine if O:PAN 514 includes a prefix (e.g., an issuer identification number or bank identification number) within a range stored by fault intercepting computing device 214. In other words, fault intercepting computing device 214 may store ranges of issuer identification numbers identifying where PAN (e.g., key value) replacement is enabled. The ranges of issuer identification numbers may be received from an issuing bank (e.g., data sources 222, shown in FIG. 2). Alternatively, fault intercepting computing device 214 may store lists of PANs eligible for updating.

In other embodiments, fault intercepting computing device 214 is configured to filter authorization requests (e.g., authorization request 512) based on a merchant identifier, identifying merchant computing device 510. For example, authorization request 512 may include a merchant identifier. In some embodiments, fault intercepting computing device 214 may store a list of excluded/disabled merchant identifiers. In other embodiments, fault intercepting computing device 214 stores a list of included/enrolled merchant identifiers. Fault intercepting computing device 214 may compare a merchant identifier included in authorization request 512 against an included and/or excluded merchant list. For example, fault intercepting computing device 214 may only process authorization requests (e.g., COF transaction authorization requests) including an enrolled merchant identifier. As another example, authorization requests including an excluded merchant identifier may be forwarded without modification to payment network computing device 520.

In some embodiments, fault intercepting computing device 214 is configured to filter out authorization requests where the O:PAN 514 is tokenized, compressed, and/or temporary. For example, fault intercepting computing device 214 may not process authorization requests including a tokenized PAN. Tokenized PANs may be ill-suited for centralized updating and replacement, as tokenized PANs may be generated for individual merchants and/or purchase transactions.

Authorization request 512 is received by fault intercepting computing device 214 using the payment network. Authorization request 512 includes outdated primary account number (O:PAN) 514. Fault intercepting computing device 214 queries key mapping database 220 with O:PAN 514. In the example embodiment, key mapping database 220 maps O:PANs to new primary account numbers (N:PANs). In other words, key mapping database 220 maps outdated PANs to updated PANs. Key mapping database 220 may be populated using issuer data sources (e.g., data sources 222, as shown in FIG. 2), including updated PANs generated and issued by the issuer(s) in response to loss, expiration, or theft of PAN values. In the example embodiment, key mapping database 220 maps O:PAN 514 to N:PAN 518. Fault intercepting computing device 214 may be configured to cache O:PAN 514 and N:PAN 518 as a key value pair in a memory device (e.g., cache 424, shown in FIG. 4), and N:PAN 518 may be used as the index to facilitate faster retrieve without requiring a database search of key mapping database 220.

Fault intercepting computing device 214 is configured to generate remapped authorization request 516 including N:PAN 518. Fault intercepting computing device 214 then transmits remapped authorization request 516 to payment network computing device 520. Payment network computing device 520 may be configured to authorize and/or decline authorization requests (e.g., COF purchase transaction authorization requests) on behalf of a payment card issuer. Alternatively, payment network computing device 520 may be an integral component of an issuing bank computing system.

Fault intercepting computing device 214 generates remapped authorization request 516 to prevent a data fault at payment network computing device 520. Payment network computing device 520 may be a specialized high throughput database system, with a low tolerance for outdated/incorrect PANs. Additionally, updating and/or reconfiguring payment network computing device 520 may unacceptably reduce transaction throughput and/or increase downtime. Thus, fault intercepting computing device 214 is configured to intercept and preprocess authorization request 512 to prevent errors at payment network computing device 520, but also to prevent time-consuming additional processing. In other words, fault intercepting computing device 214 reduces errors at payment network computing device 520 without requiring modifications or extensions to payment network computing device, maintaining its high throughput capacity.

Payment network computing device 520 processes (e.g., approves or declines) remapped authorization request 516 based on N:PAN 518, and, in response, generates authorization response 522. As used herein, "authorization response" refers to a purchase transaction authorization response, such as a COF purchase transaction authorization response.

Fault intercepting computing device 214 receives authorization response 522, including N:PAN 518, from payment network computing device 520. Fault intercepting computing device 214 automatically replaces N:PAN 518 with O:PAN 514 to generate surrogate authorization response 524. O:PAN 514 may be retrieved from the memory cache using N:PAN 518 from authorization response 522. Surrogate authorization response 524 is a surrogate response 302 (as shown in FIG. 3) such that merchant computing device 510 may correlate surrogate authorization response 524 with authorization request 512 using O:PAN 514, even though the underlying transaction authorization was processed at payment network computing device 520 using N:PAN 518.

Additionally, fault intercepting computing device 214 appends a flag 526 to surrogate authorization response 524. Flag 526 indicates that authorization request 512 was processed using a replacement/updated PAN value (e.g., N:PAN 518). Flag 526 is configured such that it does not disrupt the normal processing of authorization responses (e.g., authorization response 524) by merchant computing device 510.

In certain embodiments, merchant computing device 510 may retrieve and store updated PAN values in response to receiving flag 526. In other words, flag 526 may initiate a supplemental update process on merchant computing device 510. In one embodiment, to complete the supplemental update process, merchant computing device 510 queries key mapping database 220 to retrieve one or more updated key values. For example, merchant computing device 510 may request and retrieve N:PAN 518 from key mapping database 220 and store it locally. In one embodiment, flag 526 is included as a data element of authorization response 524 having the index "DE 48-84" and storing the value "01".

In some embodiments, flag 526 includes N:PAN 518 and/or a portion of N:PAN 518. In one embodiment, flag 526 includes the last 4 digits of N:PAN 518, such that merchant computing device 510 may subsequently determine that O:PAN 514 has been properly replaced with N:PAN 518 in local storage once N:PAN 518 is received. For example, merchant computing device may request updated PAN(s) from key mapping database 220, and subsequently verify each outdated pan was successfully updated using the portion of the updated PAN(s) included in flag 526. N:PAN 518 may include confidential data, so flag 526 may only include a portion thereof, or an encrypted or masked version thereof, to minimize the potential for compromise of the confidential data.

Figure 6:
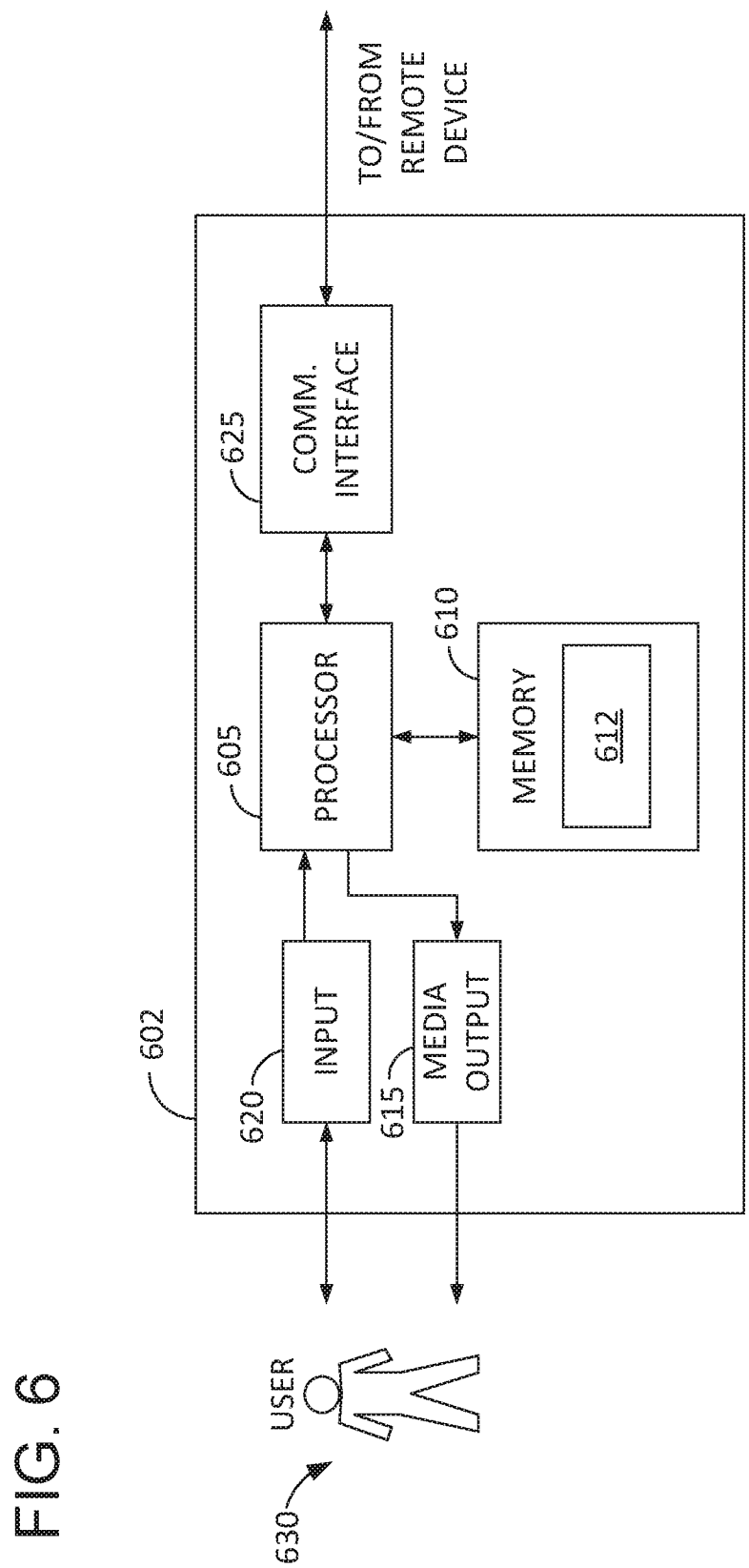
FIG. 6 depicts an example user computing device that may be used to implement the client computing device of FIG. 4.

FIG. 6 depicts a user computing device 602 that may be used to implement client computing device 110 (shown in FIG. 1). Computing device 602 includes a processor 605 for executing instructions. In some embodiments, executable instructions are stored in a memory area 610. Processor 605 includes one or more processing units (e.g., in a multi-core configuration allowing information such as executable instructions and/or other data to be stored and retrieved. Memory area 610 includes one or more computer-readable media.

Computing device 602 also includes at least one media output component 615 for presenting information to a user 630. Media output component 615 is any component capable of conveying information to user 630. In some embodiments, media output component 615 includes an output adapter, such as a video adapter and/or an audio adapter. An output adapter is operatively coupled to processor 605 and operatively coupleable to an output device such as a display device (e.g., a liquid crystal display (LCD), organic light emitting diode (OLED) display, cathode ray tube (CRT), or "electronic ink" display). In some embodiments, media output component 615 is configured to present an interactive user interface (e.g., a web browser or client application) to user 630.

Computing device 602 also includes a network interface 625, which is communicatively coupleable to a remote device, such as host computing device 118 (shown in FIG. 1) or fault intercepting computing device 214 (shown in FIG. 2). Network interface 625 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Point-of-sale (POS) application 612 is stored in memory 610, and is executed by processor 605. In the example embodiment, POS application 612 includes instructions to generate an authorization request, and receive an authorization response. POS application 612 may be configured to establish a connection to host computing device 118 and/or fault intercepting computing device 214. Additionally, memory area 610 may additionally store computer-readable instructions for providing a user interface to a user via media output component 615 and, optionally, receiving and processing input from input device 620. A user interface may include, among other possibilities, a web browser and a client application. Additionally, memory 610 may locally store key values. These locally stored key values may become outdated, with respect to key values stored by a central computing device (e.g., host computing device 118, shown in FIG. 1).

Figure 7:
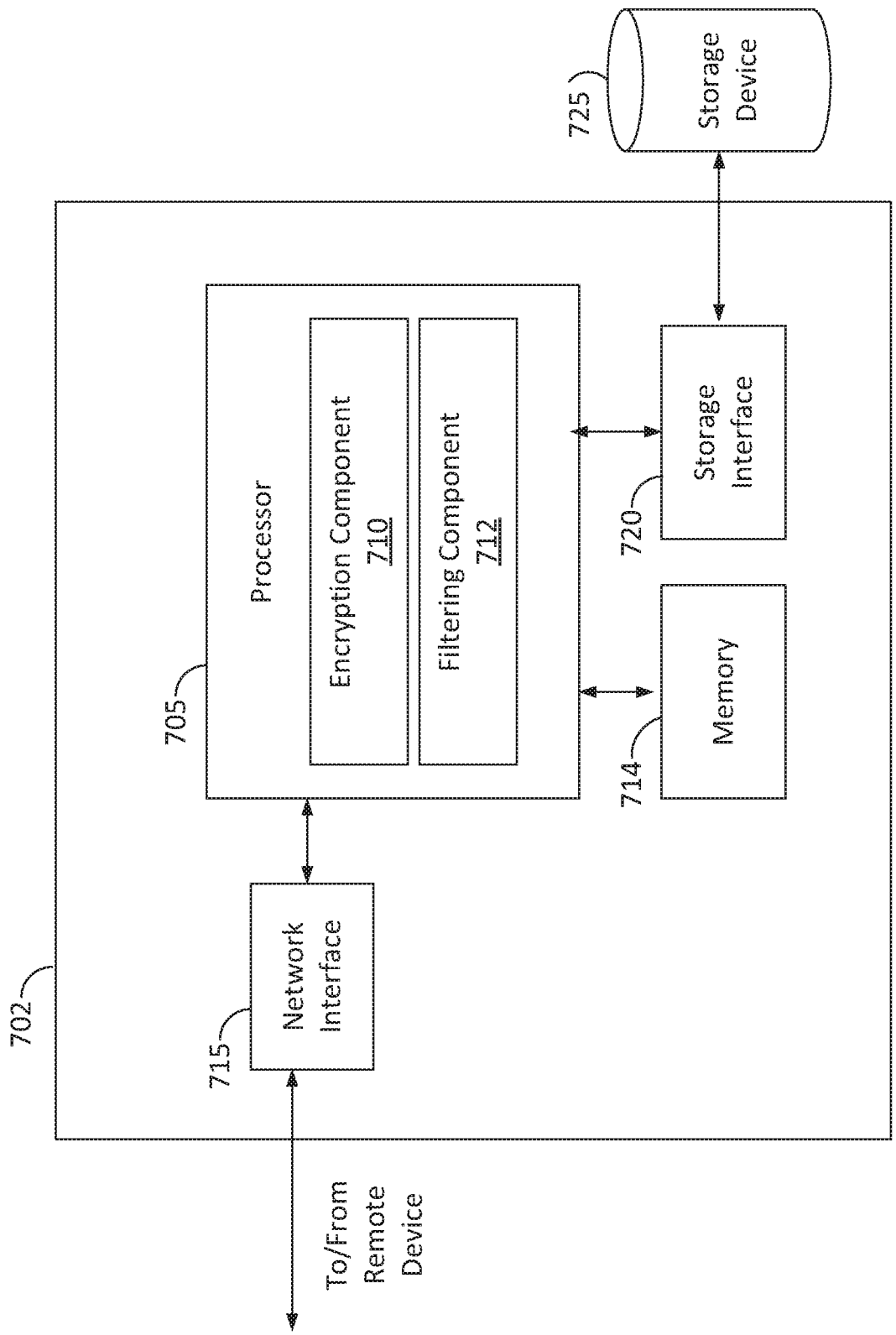
FIG. 7 depicts an example configuration of a server computing device, which may be used to implement the fault intercepting computing device of FIG. 2.

FIG. 7 depicts an example configuration of server computing device 702, including a processor 705 for executing instructions. Server computing device 702 may be used to implement host computing device 118 (shown in FIG. 1), and/or fault intercepting computing device 214 (shown in FIG. 2). Instructions are stored in a memory area 714, for example. Processor 705 includes one or more processing units (e.g., in a multi-core configuration), processor 705 is operable to execute encryption component 710 and/or filtering component 712. Components 710 and 712 may include specialized instruction sets, coprocessors, and/or kernel extensions.

Encryption component 710 is configured encrypt/decrypt data, such as authorization requests and responses. Encryption component 710 may be configured to encrypt and decrypt data based on public and/or private keys. For example, authorization request 512 (shown in FIG. 5) is encrypted using a RSA (Rivest-Shamir-Adelman) encryption public key associated with payment network computing device 520 (shown in FIG. 5). Authorization response 522 (shown in FIG. 5) may further be signed with a private key associated with payment network computing device 520. In another example, authorization request 512 and/or data stored in key mapping database 220 (shown in FIG. 2) may be encrypted using AES (Advanced Encryption Standard) encryption. In some embodiments, encryption component 710 includes specialized processor instructions configured to encrypt/decrypt data (e.g., authorization response 522, data in key mapping database 220). In another embodiment, encryption component 710 may include an encryption/decryption optimized coprocessor connected to processor 705.

Filtering component 712 is configured to filter data received from memory 714, storage interface 725, and/or network interface 715. In one embodiment, authorization requests received using network interface 715 are filtered based on the key value (e.g., PAN) of the request. For example, PANs with a certain prefix (e.g., an issuer identification number) may be selected for or excluded from further processing. In another embodiment, filtering component 712 may be configured to identify key values included in transaction authorization requests and transaction authorization responses. For example, filtering component 712 may identify and retrieve a PAN from a received request.

Processor 705 is operatively coupled to a first communication (i.e., network) interface 715. In some embodiments, first network interface 715 is configured to server computing device 702 to communicate with remote device(s) such as client computing device 110 (shown in FIG. 1). In some embodiments, network interface 715 is a virtual interface. In certain embodiments, network interface 715 is associated with a respective network address, such as an IP ("internet protocol") address. In other embodiments, network interface 715 is associated with physical network links. For example, network interface 715 may receive network packets from remote devices via Ethernet, using a switching device. Network interface 715 may be configured to transmit and/or receive requests, such as transaction authorization requests. Network interface 715 may be further configured to transmit and/or receive responses, such as authorization responses.

Processor 705 is operatively coupled to a storage device 725. Storage device 725 is any computer-operated hardware suitable for storing and/or retrieving data. In some embodiments, storage device 725 is integrated in server computing device 702. For example, server computing device 702 may include one or more hard disk drives as storage device 725. In other embodiments, storage device 725 is external to server computing device 702 and is accessed by a server computing devices 702. For example, storage device 725 may include multiple storage units such as hard disks or solid state disks in a redundant array of inexpensive disks (RAID) configuration, or may include a storage area network (SAN) and/or a network attached storage (NAS) system. Storage device 725 may include key mapping database 220 (shown in FIG. 2) and/or database 122 in communication with host computing device 118 (both shown in FIG. 1).

In some embodiments, processor 705 is operatively coupled to storage device 725 via a storage interface 720. Storage interface 720 is any component capable of providing processor 705 with access to storage device 725. Storage interface 720 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 705 with access to storage device 725.

Memory areas 610 (shown in FIG. 6) and 710 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 8:
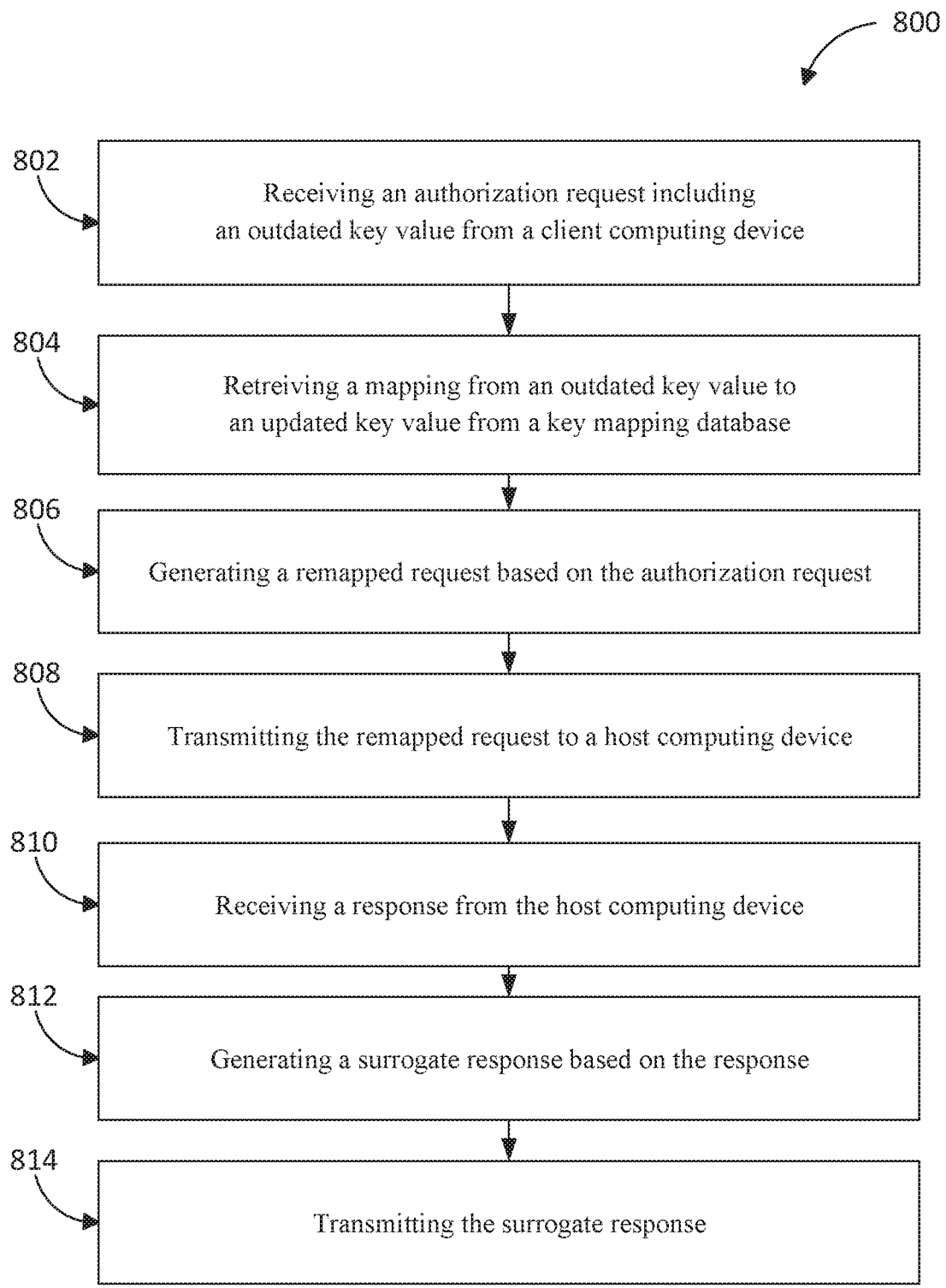
FIG. 8 is a flowchart of an example method for generating a surrogate response, using the fault intercepting computing device shown in FIG. 2.

FIG. 8 is a flowchart illustrating an example process 800, for generating surrogate responses to prevent key value faults. In the example embodiment, process 800 is implemented using the fault intercepting computing device 214 shown in FIG. 2.

Process 800 includes receiving 802 a transaction authorization request (e.g., a purchase transaction authorization request) including an outdated key value (e.g., a primary account number) from a client computing device (e.g., a merchant computing device). The outdated key value may be stored in a local memory of the client computing device, such as memory cache, persistent storage, or attached database. Process 800 includes retrieving 804, by fault intercepting computing device 214, a mapping from an outdated key value to an updated key value from a key mapping database. Retrieving 804 may include querying a key mapping database with the outdated key value included in the received request. Process 800 includes generating 806 a remapped request based on the transaction authorization request by replacing the outdated key value with the updated key value, then transmitting 808 the remapped request to a host computing device. In other words, generating 806 includes applying the retrieved mapping to the received transaction authorization request, to replace the outdated key value. The host computing device may include a payment network computing device.

Process 800 further includes receiving 810 an initial response from the host computing device and generating 812 a surrogate response based on the initial response. The initial response received from the host computing device includes the updated key value and at least one data element. Generating 812 may further include replacing the updated key value with the outdated key value and appending a flag indicating the key values were remapped before processing (e.g., a key remapped flag). Process 800 further includes transmitting 814 the surrogate response to the client computing device. The surrogate response may include the outdated key value, at least one data element from the initial response, and the key remapped flag As will be appreciated based on the foregoing specification, the above-described embodiments of the disclosure is implemented using computer programming or engineering techniques including computer software, firmware, hardware or any combination or subset thereof, wherein the technical effects described above are achieved. Any such resulting program, having computer-readable code means, is embodied or provided within one or more computer-readable media, thereby making a computer program product, (i.e., an article of manufacture), according to the discussed embodiments of the disclosure. The computer-readable media is, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code is made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A fault intercepting computing device for converting between outdated and updated key values in messages processed by client and host computing devices, the fault intercepting computing device comprising at least one processor in communication with at least one memory device, the processor programmed to:
    receive, from a client computing device, a request message configured to initiate a remote procedure at a host computing device by a function identifier, wherein the client computing device requires a response message from the host computing device including an output from the remote procedure, wherein the remote procedure is dependent on an updated key included in the request message, and wherein the request message includes an outdated key value for the key;
    prior to initiation of the remote procedure at the host computing device, retrieve the updated key value from a key mapping database by querying the key mapping database with the outdated key value, the updated key value mapped to the outdated key value in the key mapping database;
    generate a remapped request based on the request message by replacing the outdated key value with the updated key value in the request message;
    transmit the remapped request to the host computing device, wherein the remapped request remains configured to initiate the remote procedure on the host computing device;
    receive an initial response from the host computing device including the updated key value, wherein the initial response is the output of the remote procedure initiated at the host computing device by the function identifier;
    generate a surrogate response based on the initial response by replacing the updated key value with the outdated key value in the initial response;
    append a key remapped flag to the surrogate response, the key remapped flag indicating that the outdated key value is outdated and an updated key value is available; and
    transmit the surrogate response, including the outdated key value, and the key remapped flag, as the response message from the host computing device to the client computing device, wherein the outdated key value in the surrogate response enables the client computing device to identify the surrogate response as the response message to the request message including the outdated key value.

2. The fault intercepting computing device of claim 1, wherein the processor is further programmed to:
    cache, after retrieving the updated key value, the retrieved updated key value and the outdated key value in the at least one memory device; and
    retrieve, after receiving the initial response from the host computing device, the outdated key value by querying the cached values in the at least one memory device, to enable generating the surrogate response, without re-querying the key mapping database.

3. The fault intercepting computing device of claim 2, wherein the key remapped flag is configured to automatically initiate a supplemental update process on the client computing device, and the processor is further programmed to:
    receive, in response to the supplemental update process initiated on the client computing device, an update request from the client computing device including the outdated key value;

retrieve, in response to the update request, the updated key value by querying the cached values in the at least one memory device with the outdated key value; and transmit the updated key value to the client computing device in a supplemental update response to enable the client computing device to update the locally stored outdated key value as part of the supplemental update process.

4. The fault intercepting computing device of claim 1, wherein the at least one memory device stores an enabled prefix range, which defines key values eligible for updating, and the processor is further programmed to:

determine that the outdated key value is eligible for updating, by comparing a prefix of the outdated key value to the enabled prefix range.

5. The fault intercepting computing device of claim 1, wherein the key remapped flag is configured to automatically initiate a supplemental update process on the client computing device, and the processor is further programmed to:

receive, in response to the supplemental update process initiated on the client computing device, an update request from the client computing device including the outdated key value; and transmit the updated key value to the client computing device in a supplemental update response to enable the client computing device to update the locally stored outdated key value as part of the supplemental update process.

6. The fault intercepting computing device of claim 5, wherein the key remapped flag of the surrogate response includes the last four digits of the updated key value, to enable the client computing device to verify the updated key value by comparing the updated key value to the key remapped flag.

7. The fault intercepting computing device of claim 1, wherein the outdated key value is an outdated primary account number associated with a payment account used to initiate a payment transaction at the client computing device, the request message is an authorization request, the updated key value is an updated primary account number associated with the payment account, and the processor is further configured to:

receive the outdated primary account number and the updated primary account number from an issuer data source, wherein the updated primary account number was generated by the issuer data source to replace the outdated primary account number; and store the updated primary account number in the key mapping database with the outdated primary account number as an index.

8. A fault intercepting computing system for converting between outdated and updated key values in messages processed by client and host computing devices, the fault intercepting computing system comprising:

a key mapping database, storing updated primary account numbers (PANs) indexed by outdated PANs;

a memory cache, wherein the memory cache is optimized for random data accesses and stores outdated PANs indexed by updated PANs; and a fault intercepting computing device, including at least one processor in communication with the memory cache and the key mapping database, the fault intercepting computing device is configured to:

receive, from a client computing device, an authorization request configured to initiate a remote procedure at a host computing device by a function identifier, wherein the client computing device requires a response message from the host computing device including an output from the remote procedure, wherein the remote procedure is dependent on an updated PAN value included in the authorization request, and wherein the authorization request includes an outdated PAN as the PAN value;

prior to initiation of the remote procedure at the host computing device, retrieve the updated PAN from the key mapping database by querying the key mapping database with the outdated PAN, the updated PAN mapped to the outdated PAN in the key mapping database;

cache the outdated PAN in the memory cache using the updated PAN as the index;

generate a remapped request based on the authorization request by replacing the outdated PAN with the updated PAN in the authorization request;

transmit the remapped request to the host computing device, wherein the remapped request remains configured to initiate the remote procedure on the host computing device;

receive an initial response from the host computing device, including the updated PAN, wherein the initial response is the output of the remote procedure initiated at the host computing device by the function identifier;

retrieve the outdated PAN from the memory cache, by querying the memory cache with the updated PAN;

generate a surrogate response based on the initial response by replacing the updated PAN with the outdated PAN in the initial response;

append a key remapped flag to the surrogate response, the key remapped flag indicating that the outdated PAN is outdated and an updated PAN is available; and transmit the surrogate response, including the outdated PAN, and the key remapped flag, as the response message from the host computing device to the client computing device, wherein the outdated PAN in the surrogate response enables the client computing device to identify the surrogate response as the response message to the authorization request including the outdated PAN.

9. The fault intercepting computing system of claim 8, wherein the key remapped flag is configured to automatically initiate a supplemental update process on the client computing device, and fault intercepting computing device is further configured to:

receive, in response to the supplemental update process initiated on the client computing device, an update request from the client computing device including the outdated PAN;

retrieve, in response to the update request, the updated PAN by querying the memory cache with the outdated PAN; and transmit the updated PAN to the client computing device in a supplemental update response to enable the client computing device to update the locally stored outdated PAN as part of the supplemental update process.

10. The fault intercepting computing system of claim 9, wherein the key remapped flag of the surrogate response includes the last four digits of the updated PAN, to enable the client computing device to verify the updated PAN by comparing the updated PAN to the key remapped flag.

11. The fault intercepting computing system of claim 8, wherein the memory cache further stores an issuer prefix range, which defines PANs eligible for updating, and the processor is further programmed to:
determine that the outdated PAN is eligible for updating, by comparing an issuer prefix of the outdated PAN to the issuer prefix range.

12. The fault intercepting computing system of claim 8, wherein the key mapping database is configured to retrieve updated PANs using outdated PANs in a consistent amount of time across queries using the updated PANs as indexes.

13. The fault intercepting computing system of claim 8, wherein the key mapping database is indexed by outdated PANs to enable the fault intercepting computing device to directly identify a memory location in the key mapping database of the updated PANs.

14. The fault intercepting computing system of claim 8, wherein fault intercepting computing device is further configured to:
receive the outdated PAN and the updated PAN from an issuer data source, wherein the updated PAN was generated by the issuer data source to replace the outdated PAN; and
store the updated PAN in the key mapping database with the outdated PAN as the index.

15. A fault intercepting computing device for converting between outdated and updated PANs in messages processed by merchant and payment network computing devices, the fault intercepting computing device comprising at least one processor in communication with at least one memory device, the processor programmed to:
receive, from a client device, a transaction authorization request message configured to initiate a payment transaction authorization procedure at an issuer computing device by a function identifier, wherein the client device requires an authorization response message from the issuer computing device including an output from the payment transaction authorization procedure, wherein the payment transaction authorization procedure is dependent on an updated PAN value included in the transaction authorization request message, and wherein the transaction authorization request message includes as the PAN value an outdated PAN from a merchant computing device at which a payment transaction is initiated using the outdated PAN associated with a payment account;
prior to initiation of the payment transaction authorization procedure at the issuer computing device, retrieve the updated PAN from a key mapping database by querying the key mapping database with the outdated PAN;
generate a remapped authorization request message by replacing the outdated PAN with the updated PAN in the transaction authorization request message;
transmit the remapped authorization request message to the issuer computing device, wherein the remapped authorization request message remains configured to initiate the payment transaction authorization procedure on the issuer computing device;
receive a transaction authorization response from the issuer computing device including the updated PAN, wherein the transaction authorization response is the output of the payment transaction authorization procedure initiated at the payment network computing device by the function identifier;
generate a surrogate authorization response based on the transaction authorization response by replacing the updated PAN with the outdated PAN in the transaction authorization response;
append a key remapped flag to the surrogate authorization response, the key remapped flag indicating that the outdated PAN is outdated and an updated PAN is available; and
transmit the surrogate authorization response, including the outdated PAN, and the key remapped flag, as the authorization response message from the issuer computing device to the merchant computing device, wherein the outdated PAN in the surrogate authorization response enables the merchant computing device to identify the surrogate authorization response as the authorization response message to the transaction authorization request message including the outdated PAN.

16. The fault intercepting computing device of claim 15, wherein the processor is further programmed to:
cache, after retrieving the updated PAN, the retrieved updated PAN and the outdated PAN in the at least one memory device; and
retrieve, after receiving the transaction authorization response from the payment network computing device, the outdated PAN by querying the cached values in the at least one memory device, to enable generating the surrogate authorization response.

17. The fault intercepting computing device of claim 16, wherein the key remapped flag is configured to automatically initiate a supplemental update process on the merchant computing device, and the processor is further programmed to:
receive, in response to the supplemental update process initiated on the merchant computing device, an update request from the merchant computing device including the outdated PAN;
retrieve, in response to the update request, the updated PAN by querying the at least one memory device with the outdated PAN; and
transmit the updated PAN to the merchant computing device in a supplemental update response to enable the merchant computing device to update the locally stored outdated PAN as part of the supplemental update process.

18. The fault intercepting computing device of claim 17 wherein the at least one memory device stores an issuer prefix range, which defines PANs eligible for updating, and the processor is further programmed to:
determine that the outdated PAN is eligible for updating, by comparing an issuer prefix of the outdated PAN to the issuer prefix range.

19. The fault intercepting computing device of claim 15, wherein the key remapped flag is configured to automatically initiate a supplemental update process on the merchant computing device, and the processor is further programmed to:
receive, in response to the supplemental update process initiated on the merchant computing device, an update request from the merchant computing device including the outdated PAN; and
transmit the updated PAN to the merchant computing device in a supplemental update response to enable the merchant computing device to update the locally stored outdated key value as part of the supplemental update process.

20. The fault intercepting computing device of claim 19, wherein the key remapped flag of the surrogate authorization response includes the last four digits of the updated PAN, to enable the merchant computing device to verify the updated PAN by comparing the updated PAN to the key remapped flag.

21. The fault intercepting computing device of claim 15, wherein processor is further configured to:
   receive the outdated PAN and the updated PAN from an issuer data source, wherein the updated PAN was generated by the issuer data source to replace the outdated PAN; and
   store the updated PAN in the key mapping database with the outdated PAN as an index.

* * * * *